US011321821B2

(12) United States Patent
Allan et al.

(10) Patent No.: US 11,321,821 B2
(45) Date of Patent: May 3, 2022

(54) METHOD AND SYSTEM FOR GENERATING COMPOSITE GEOSPATIAL IMAGES

(71) Applicant: Ordnance Survey Limited, Southampton (GB)

(72) Inventors: Lynne Allan, Southampton (GB); Miles Austen, Southampton (GB)

(73) Assignee: Ordnance Survey Limited, Southampton (GB)

( * ) Notice: Subject to any disclaimer, the term of this patent is extended or adjusted under 35 U.S.C. 154(b) by 101 days.

(21) Appl. No.: 16/785,754

(22) Filed: Feb. 10, 2020

(65) Prior Publication Data

US 2020/0258205 A1  Aug. 13, 2020

(30) Foreign Application Priority Data

Feb. 12, 2019  (EP) ..................... 19156755

(51) Int. Cl.
*G06T 5/50* (2006.01)
(52) U.S. Cl.
CPC ..................... *G06T 5/50* (2013.01)
(58) Field of Classification Search
None
See application file for complete search history.

(56) References Cited

U.S. PATENT DOCUMENTS

| 6,658,027 B1 * | 12/2003 | Kramer ................. H04J 3/0632 370/516 |
| 9,230,308 B2 | 1/2016 | Ma |
| 10,586,105 B2 * | 3/2020 | Freitag ................... A01G 22/00 |
| 2011/0064280 A1 * | 3/2011 | Sasakawa ............. G06T 3/4038 382/113 |
| 2011/0314026 A1 | 12/2011 | Pickens et al. |
| 2012/0224772 A1 | 9/2012 | Mitchell et al. |

(Continued)

FOREIGN PATENT DOCUMENTS

| CN | 102105902 B * | 3/2013 | ........... G06T 3/4038 |
| JP | 2001143054 A * | 5/2001 | |

(Continued)

OTHER PUBLICATIONS

Machine Translation JP 6467567 B2 (Year: 2019).*

(Continued)

*Primary Examiner* — Michelle M Entezari
(74) *Attorney, Agent, or Firm* — Banner & Witcoff, Ltd.

(57) ABSTRACT

The present disclosure provides a computer implemented method and system for compensating for cloud cover to allow the build-up of composite, cloud free images of a particular geographic area. The disclosure takes satellite or aerial image data as an input and temporally stacks the images for a particular geographic area, with the most recent image at the top. The time for the composite image to be produced (which may be the present time, or may be a time from the past) is defined as a temporal projection plane. The most recent image prior to or temporally proximate to this plane is analysed to identify any areas obscured by clouds. Cloud free areas of the most recent image are projected onto the temporal projection plane. For the identified obscured areas, older, cloud free images in the stack are projected onto the temporal projection plane to fill the obscured areas. This forms a cloud free composite image at the defined temporal projection plane.

16 Claims, 7 Drawing Sheets

(56) References Cited

U.S. PATENT DOCUMENTS

| | | | | |
|---|---|---|---|---|
| 2018/0253862 A1* | 9/2018 | Barnes | ............... | G06T 17/20 |
| 2019/0108384 A1* | 4/2019 | Wang | ............... | G06K 9/4652 |
| 2019/0335674 A1* | 11/2019 | Basso | ............... | G01N 21/00 |
| 2020/0074605 A1* | 3/2020 | Goyal | ............... | G06T 5/005 |
| 2020/0126232 A1* | 4/2020 | Guo | ............... | G06K 9/00657 |

FOREIGN PATENT DOCUMENTS

| | | | |
|---|---|---|---|
| JP | 6467567 B2 * | 2/2019 | |
| KR | 101979879 B1 * | 5/2019 | |
| WO | 03069558 A1 | 8/2003 | |

OTHER PUBLICATIONS

Machine Translation KR 10-1979879 B1 (Year: 2019).*
Machine Translation JP 2001-143054 A (Year: 2001).*
Hughes, M. Joseph, and Daniel J. Hayes. "Automated detection of cloud and cloud shadow in single-date Landsat imagery using neural networks and spatial post-processing." Remote Sensing 6.6 (2014): 4907-4926. (Year: 2014).*
Cerra, Daniele, et al. "Cloud removal in image time series through sparse reconstruction from random measurements." IEEE Journal of Selected Topics in Applied Earth Observations and Remote Sensing 9.8 (2016): 3615-3628. (Year: 2016).*
CN 102105902 B Machine Translation (Year: 2013).*
Wang, Bin et al., "Automated Detection and Removal of Clouds and Their Shadows from Landsat TM Images," Feb. 1, 1999, 8 pages.
Apr. 15, 2019—(EP) Extended EP Search Report—Application No. 19156755.1.

* cited by examiner

Figure 4a: Satellite/Aerial Image with clouds (B)

Figure 4b: Composite Image (A) using mainly image (B) with imagery from (C) and (D) where clouds have obstructed the original satellite image Key

Figure 7

METHOD AND SYSTEM FOR GENERATING COMPOSITE GEOSPATIAL IMAGES

FIELD

The disclosure relates to a computer implemented method and system for generating composite geospatial images that use image data from a plurality of images of the same geographic area in order to compensate for cloud cover. In particular, the methods and systems allow the build-up of composite, cloud free images of a particular geographic area.

BACKGROUND

Satellite or aerial imagery is highly useful for being able to see changes in large geographical land areas over time. Satellite or aerial imagery provides large-scale information that cannot be gathered from surveying land on the ground, such as forest monitoring, urban growth, and agricultural biodiversity. However, one problem with satellite or aerial imagery is cloud obscuration. Decades of satellite observations have shown that clouds dominate space-based views of Earth. It is estimated that about 67% of the Earth's surface is typically covered by clouds. This is a significant problem in satellite imagery as cloud cover causes data loss and gaps.

A SILVIS lab researcher, Glen Aronson, at the University of Wisconsin-Madison has previously used a method to mitigate cloud cover by isolating the cloudy portions of an image and substituting the cloudy pixels with clear pixels from other images of the same area taken within the same season as the base image. (http://silvis.forest.wisc.edu/research/always-birght-side-life-removing-clouds-and-their-shadows-satellite-imagery Accessed 27 Sep. 2018). However, Aronson has not disclosed how this effect is achieved, and in particular the processing that is performed to achieve this effect. Computationally efficient and user-friendly methods and systems for generating cloud free overhead imagery of geographic areas are therefore still desirable.

SUMMARY

The present disclosure relates to a technique for compensating for cloud cover to allow the build-up of composite, cloud free images of a particular geographic area. Embodiments of the disclosure operate by virtually temporally stacking overhead imagery (for example aerial or satellite imagery) of the same area by date of capture. A virtual temporal projection plane is then defined specifying the date for when a composite image is to be produced, which may be the present date, or a historical date, and then a virtual projection from the virtual image stack is taken to the projection plane, with occluded areas in a more recent image in the stack from cloud cover being filled by virtual projection from a lower image in the stack. Once produced, the cloud free images can then be used for different purposes, including detection of changes in geospatial properties of the geographic area between two points in time. For example, in one such use changes in vegetation, such as number or sizes of trees or extent of hedgerows, or growth of crops, can be determined by comparison of cloud free images generated for two temporally separated points in time.

In view of the above, one aspect described herein relates to a computer implemented method of generating an image of a geographic area, comprising:

a) storing a plurality of overhead images of the geographic area, the images having been obtained at different points in time and temporally sorted such that the temporal ordering of the images is known;

b) receiving a user input defining a point in time at which an image of the geographic area is desired;

c) selecting, based on temporal proximity to the defined point in time, an image from the plurality of images to act as a base image;

d) determining any areas in the base image in which the geographic surface is occluded, for example by clouds or other obstructions;

e) selecting a second one of the plurality of overhead images that is temporally earlier than the base image; and f) substituting geographically corresponding sections of the selected second image where the ground is not occluded into the base image to replace those areas in the base image where the geographic surface is occluded to provide a composite image.

In this way, a virtual temporal stack of images can be used to generate a new composite image that is free of occlusions at any time for either the present or past. Cloud occlusions in imagery can therefore be prevented whilst still using as up to date image data as possible or most of the image.

In this respect, the image that is selected as the base image may be the most recent image in the temporal stack if a contemporary image is desired as the output. Otherwise, where historical imagery is desired then the base image may be selected to be the image closest in time to the historical time point for which a composite image is desired as the output. In this respect, embodiments and aspects herein allow for historical cloud free images to also be produced, by using images from further in the past in the temporally sorted virtual image stack.

In one embodiment the steps e) and f) are repeated with progressively earlier images being used as the second image until all parts of the base image where the ground is occluded have been replaced with non-occluded imagery from earlier images. This allows for the most up-to date cloud-free parts of the images in the temporal stack to be used to contribute to the composite image being generated.

In some embodiments the overhead images are one of: i) satellite images; and/or ii) aerial images. A mixture of satellite and aerial images may be used in the virtual temporal stack of images if the image resolutions and scales match.

In one embodiment the second one of the plurality of overhead images is selected in dependence on the selected image being seasonally matching to the base image.

One embodiment further comprises inserting a new overhead image taken at a point in time into the sorted plurality of overhead images, the image being inserted into the sorted images at a point such that the temporal sorting of the plurality of images is maintained, and repeating steps b) to f) above on the basis of the sorted images including the new overhead image. This allows a new image or images to be inserted into the temporal stack of images, and for the resultant image to be updated to take into account the new image or images. In this way, the resultant image is kept as accurate as possible if new historical image data becomes available.

One embodiment also includes removing one of the overhead images taken from the sorted plurality of overhead images, and repeating steps b) to f) above on the basis of the sorted images excluding the removed overhead image. This may be used to update a generated image if it is later found that one of the images in the stack that it is based upon should not be relied upon.

In the above embodiments the updating of the resultant image may be dynamically performed when any addition or removal of images to or from the temporally sorted images is undertaken. In this way, the resultant image is automatically updated whenever any changes are made to the stack of images on which it is based.

A further aspect described herein relates to a computer-implemented method of detecting changes in a geographic area, the method comprising:

a) generating two images of the geographic area using the method of any of the above aspects, the images being respectively generated for different points in time separated by a change period over which changes are to be detected; and
   i. comparing the two images to detect changes in geospatial features in the geographic area depicted in the images.

In some embodiments the changes in geospatial features that are detected include one or more of:

changes in the size, location and/or extent of vegetation; and/or a) ii) changes in the size, location and/or extent of buildings.

In particular, in one particular embodiment the changes include changes in the size, location, and/or extent of hedgerows.

Another aspect of the present disclosure provides a computer system, comprising: i) a processor; ii) a display; iii) a user input device; and iv) a computer readable storage medium, the computer readable storage medium storing a computer program arranged such that when it is executed it causes the computer system to operate in accordance with the method of the above aspect.

Another aspect described herein relates to a computer implemented method of producing a user-requested image comprising:

chronologically ordering a plurality of stored images of a geographical area, each stored image corresponding to a respective temporal point along a timeline;

defining a temporal projection plane, wherein the temporal projection plane relates to an image point, the image point being an additional temporal point on the timeline;

selecting a first image from the plurality of stored images, the first image corresponding to the temporal point directly preceding the image point;

identifying obstruction free areas in the selected image;

projecting the identified areas of the selected image onto the temporal projection plane to at least partially form the user-requested image; and repeating steps iv and v for successive images from the plurality of images corresponding to increasingly earlier temporal points along the timeline until the user-requested image is complete.

In one embodiment the temporal projection plane may relate to a time which is current or in the past.

In another embodiment the plurality of images are captured in the same season as the first selected image.

BRIEF DESCRIPTION OF THE DRAWINGS

Further features and advantages of the disclosure will become apparent from the following description of embodiments thereof, presented by way of example only, and by reference to the drawings, wherein.

DETAILED DESCRIPTION

Aspects described herein relate to a computer implemented method for removing clouds from overhead imagery, such as satellite or aerial imagery. Overhead imagery of the same geographical area is virtually stacked temporally. A temporal projection plane is defined where the composite image is to be formed. The most recent image prior to the defined projection plane is analysed to identify any cloud cover. Cloud free areas of the most recent image are virtually projected onto the projection plane. Where there are areas of cloud cover, older images with cloud free imagery in that area are virtually projected onto the virtual projection plane to fill the gaps left by the cloud obscuration. This results in a cloud free composite image formed at the virtual projection plane.

Figure 3:
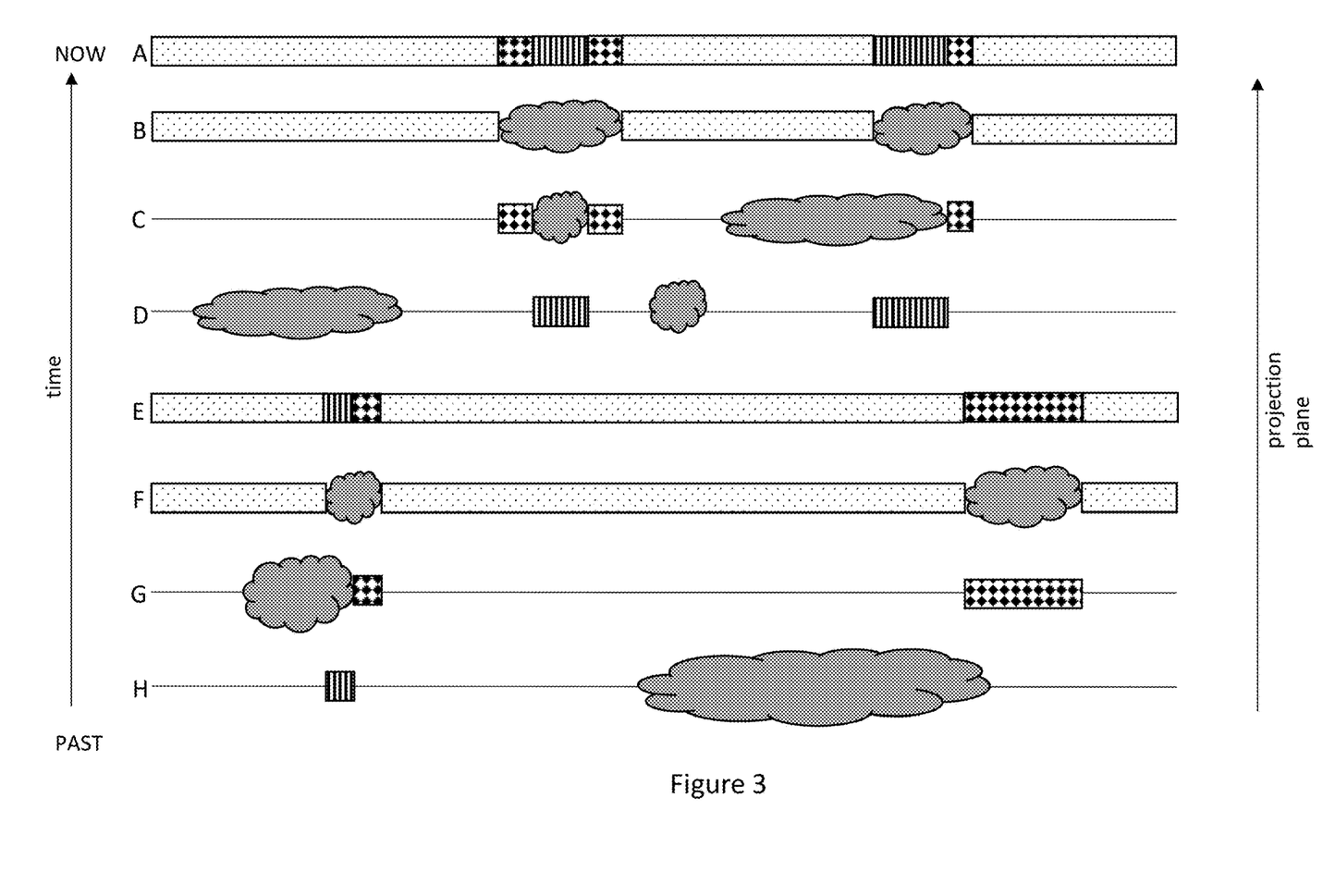
FIG. 3 is a diagram illustrating an example image stack, showing how a composite image is formed from images from different times.

In more detail, whenever an overhead image of a geographic area is captured, there is the possibility that some parts of the underlying landscape are occluded by cloud cover in the image, which manifests as occlusions of the landscape in the respective images. Clearly, different images of the same landscape captured at different times will have different cloud occlusions. To compensate for this issue, embodiments of the present disclosure perform a virtual temporal projection from within the stack to the present (or to some defined time in the past for which an image is required) for those parts of the image. For example, as shown in FIG. 3, to create an image for the present, most of the image is taken from image slice B, but there are two cloud occlusions therein. The occlusions require image data from slice C and slice D, as slice C also has smaller occlusions in the same positions. By taking an appropriate virtual projection from within the virtual temporal stack of images for each part of the image, a composite, cloud free image can be constructed.

Embodiments of the present disclosure also allow historical cloud free images to be created, for example as shown by the example image plane at time E. A further aspect is that the slices chosen to fill in an occlusion can be seasonally selective, as there is little point in selecting the next image in the virtual temporal stack to fill in an occlusion if it is a winter scene and the occlusion is in a summer scene. Instead, the virtual stack should be searched (downwards i.e. backwards in time) for the next seasonal matching image with no cloud occlusion for the pixel concerned.

One use of the cloud free images is to permit automated change detection in geospatial features between two points in time for which separate cloud free images have been produced. For example, vegetation features in the cloud free images can be identified, and any changes in the vegetation in the same area for which two temporally separated cloud free images have been produced then automatically determined. Changes in vegetation may include changes in the size and number of trees, the extent of hedgerows in the area, or the extent of crop growth. Detection of hedgerow extent can help to enforce governmental rural policies, as in some jurisdictions payments to landowners are made in dependence on the extent of hedgerows on a landowners land, and detection techniques such as those described above help to prevent fraudulent payments being claimed. Similarly, detection of crop growth can also help with the enforcement of various governmental agricultural policies aimed at encouraging or discouraging growth of particular crops.

Figure 1:
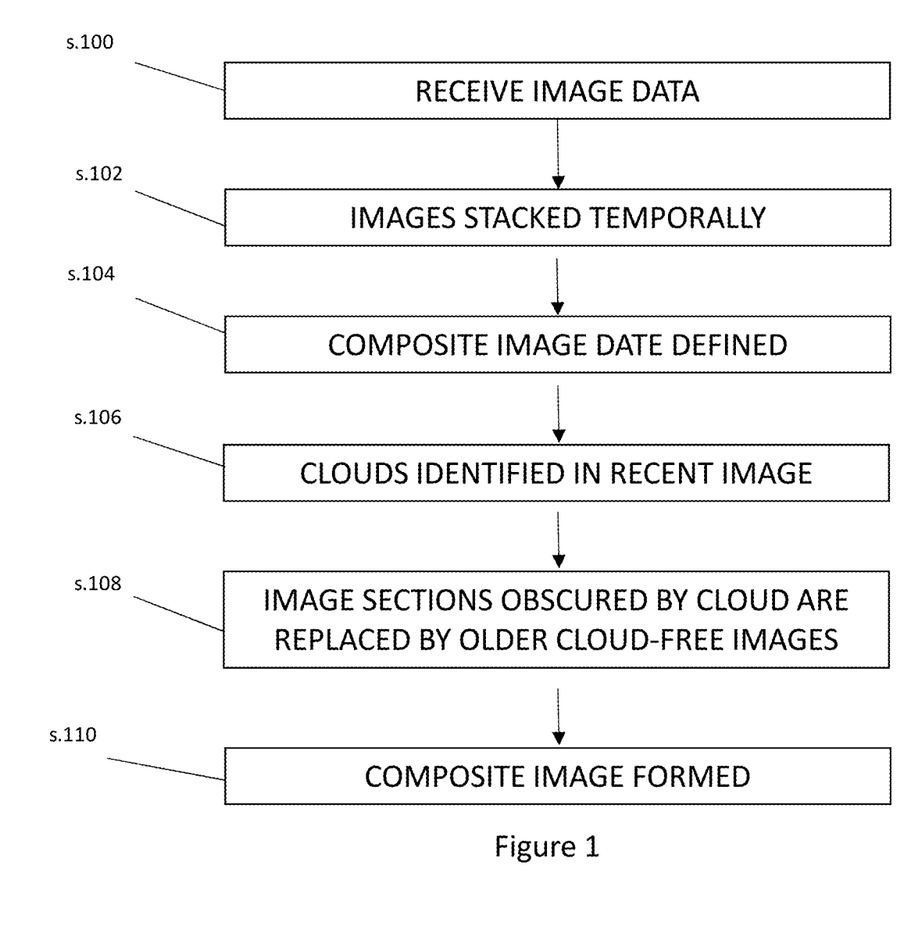
FIG. 1 is a flow diagram illustrating an illustrative embodiment described herein.

FIG. 1 illustrates a computer-implemented method of removing clouds from satellite imagery. Overhead imagery data such as satellite/aerial image data is received and stored in a computer system (s.100) (see FIG. 2 for the computer system). Images of the same geographical area are virtually temporally stacked on top of each other (s.102), ordered by date of capture, as shown in FIG. 3. The date for the composite image (A) is then defined (s.104) and the most recent image (B) taken before that date is analysed. The analysis involves identifying the locations of clouds in the most recent image (s.106). For these identified cloud locations in the image, the method looks at the next-oldest image (image C, in FIG. 3) in the virtual stack and analyses it at those identified locations. The analysis determines whether there are clouds present at the same geographic location in the image as there are clouds in image B i.e. at the corresponding sections of images C that correspond to the sections of image B that are occluded by clouds. If there are not any clouds at those corresponding sections, the method virtually projects the cloud free image (s. 108) from image C onto image B, to form image A (see s.110). This process is illustrated in more detail in FIGS. 3 and 4.

Figure 2:
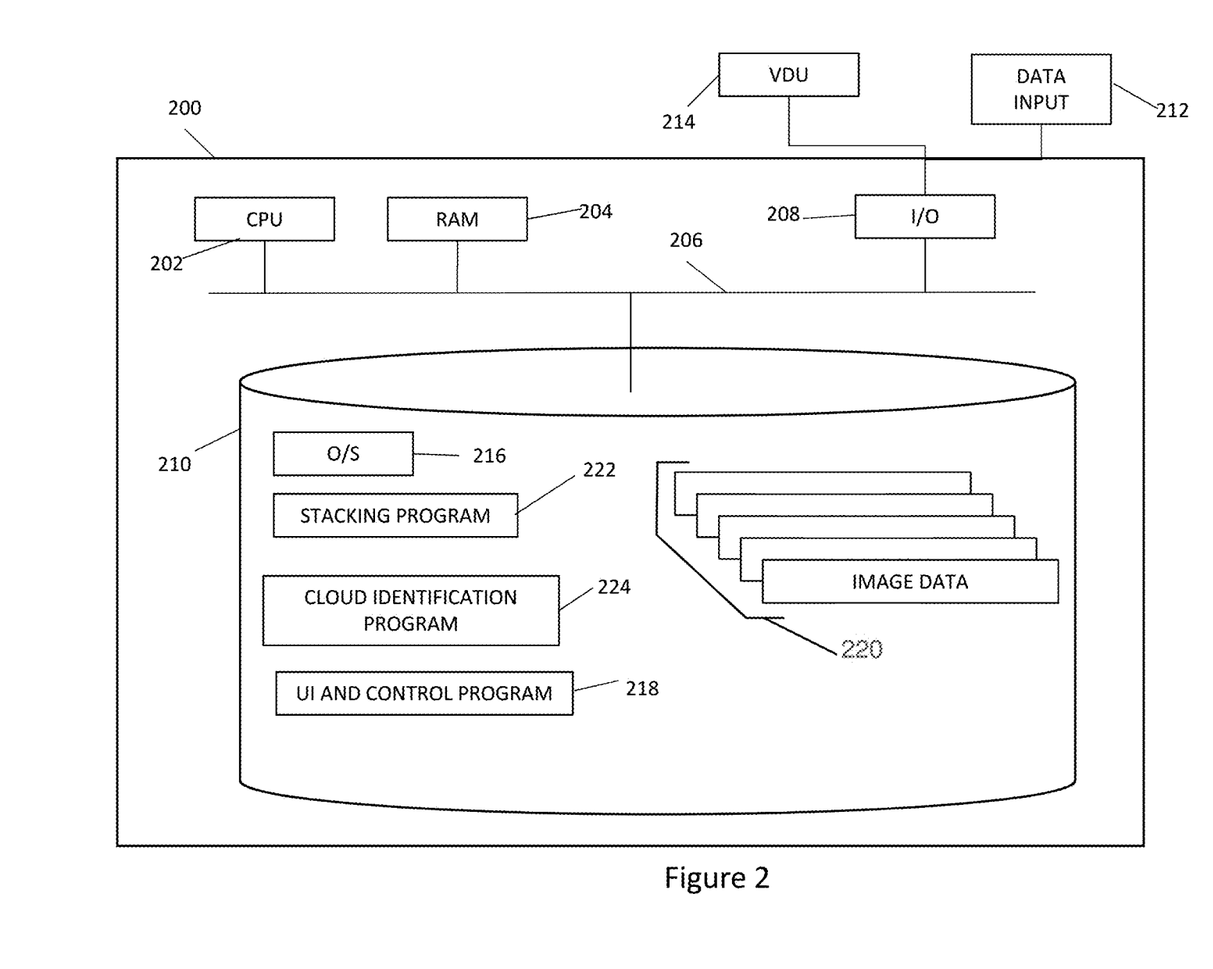
FIG. 2 is a block diagram illustrating a computer system on which one or more embodiments described herein may be implemented.

FIG. 2 illustrates an example of a computer system 200 that may form the platform for embodiments and aspects described herein. The computer system 200 comprises a central processing unit (CPU) 202 and a working memory 204, connected by a common bus 206, and having an input-output (I/O) interface 208 arranged to receive control inputs from a user via a device connected to a data input port 212 such as a keyboard, mouse, or other controller, and provide output information via a user interface which is displayed on an device having a visual display unit 214 such as a computer screen, television, mobile device or any other device capable of providing a visual display.

The computer system 200 is also provided with a computer readable storage medium 210 such as a hard disk drive (HDD), flash drive, solid state drive, or any other form of general-purpose data storage, upon which various programs are arranged to control the computer system 200 to operate in accordance with embodiments and aspects described herein. For example, stored on the computer readable storage medium 210 is an operating system program 216 that when run by the CPU 202 allows the system to operate. Also provided is a virtual stacking program 222, and a cloud identification program 224, which together implement the present embodiment when run by the CPU 202, as will be described in more detail below. In order to interface with the virtual stacking program 222 and the cloud identification program 224, a user interface and control program 218 is also provided, that controls the computer 200 to provide a visual output to the VDU 214, and to receive user inputs via a keyboard, or another peripheral such as a mouse connected to the data input port 212, in order to control the stacking program 222 and the cloud identification program 224.

Input data upon which the stacking program 222 and cloud identification program 224 operate includes data input to the computer system 200 received via the data input port 212. Such data may include instructions identifying a particular geographic area, as well as image data 220 which is subsequently stored in the computer readable storage medium 210. The image data 220 comprises any image data of a particular geographic area, such as aerial images, obtained for example via satellites or via survey aircraft. This image data 220 may be received periodically or any time new data is available.

FIG. 3 explains the present embodiment in more detail. Aerial or satellite imagery of the same geographic area is obtained over time, with multiple images being obtained of the same area at different temporal points. These images are then virtually spatially aligned in a temporally ordered image stack, as shown by the stack formed from images B, C, D, F, G, H, where image plane B is the most recently obtained image, and image plane H the oldest image. Plane A is the current composite image formed from images B, C and D. Plane E is the historical composite image formed from images F, G and H.

Figure 4A:
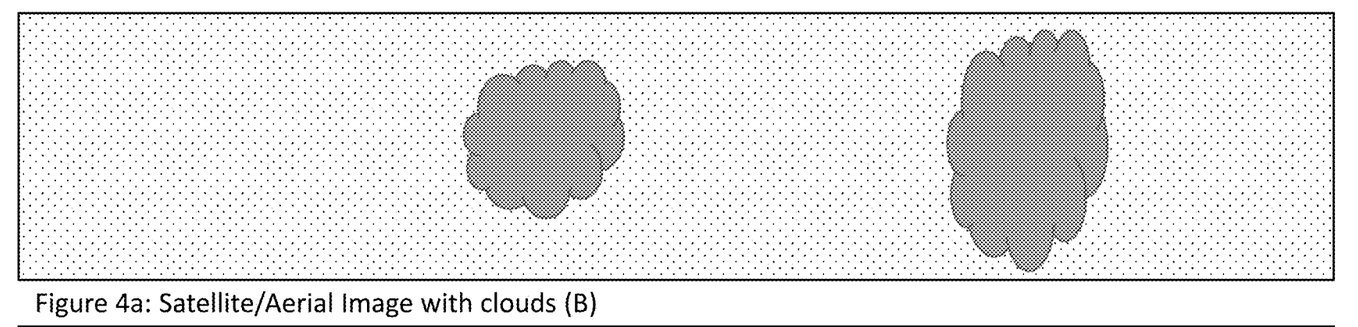
FIG. 4a is a diagram illustrating a 2D example of how image B from FIG. 3 could appear.
Figure 4B:
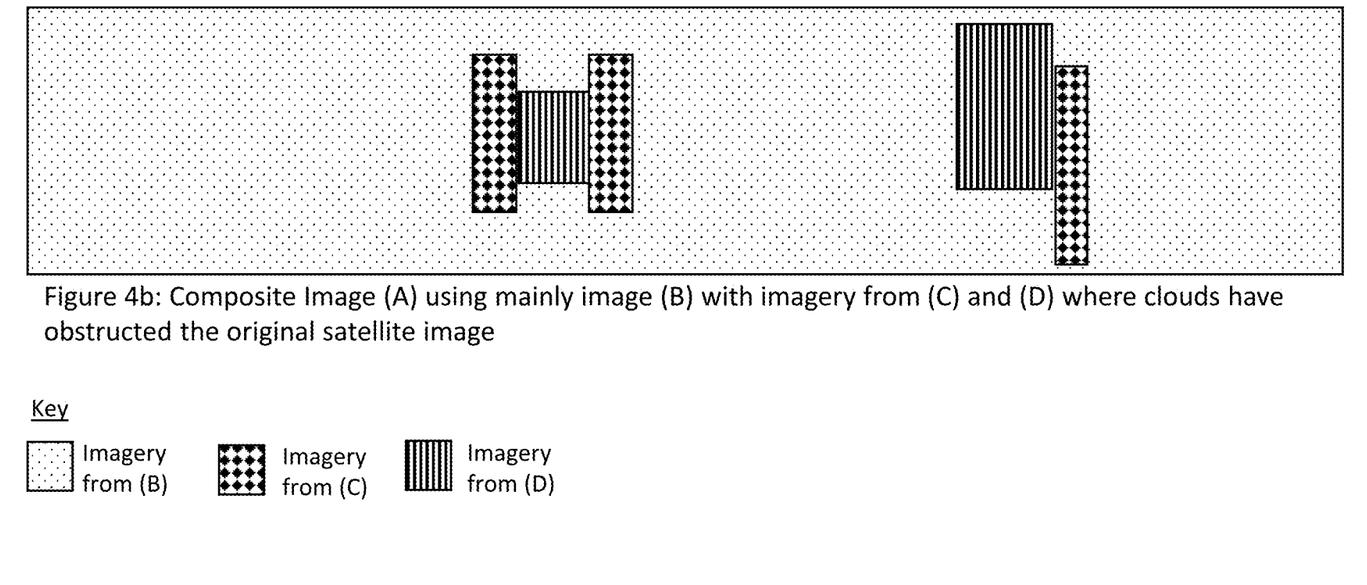
FIG. 4b is a diagram illustrating a 2D example of the composite image A.

FIG. 4a shows the image in plane B of FIG. 3 as it might look in 2D i.e. by looking at the image plane from a direction orthogonal to the plane. From FIG. 4a is will be seen that in this example there are two clouds obscuring the image. FIG. 4b shows how the clouds may be removed by using areas of image planes C and D patched together with the original image plane B, using the method described above.

Figure 5A:
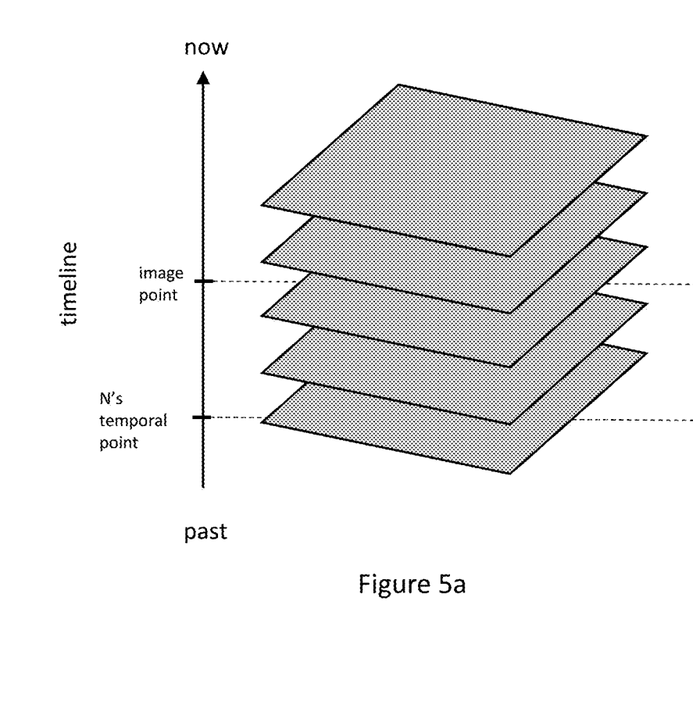
FIG. 5a is a diagram illustrating an example of how the chronological ordering of the plurality of images may be visualised as a stack.

FIG. 5a is a diagram illustrating an example of how the chronological ordering of the plurality of images may be visualised as a virtual temporal stack. Of course, by virtual we mean that the images are simulated as being in a temporal stack by the computer system. Moreover, within the virtual temporal stack the images are spatially aligned, such that pixels relating to and showing the same real geospatial location in the same location are known to correspond to one another and can be substituted for each other to build up a composite image as described.

Figure 5B:
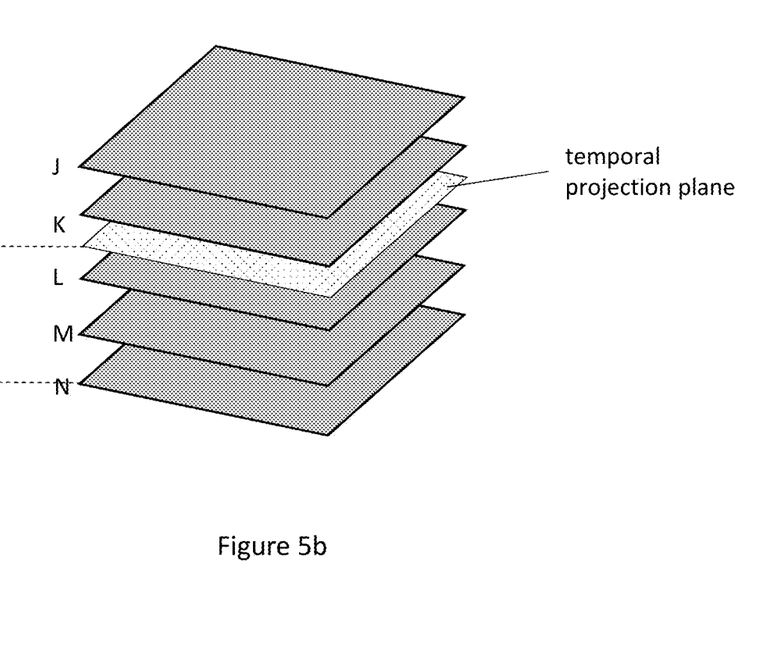
FIG. 5b is a diagram illustrating how the temporal projection plane, image point and temporal points for each image may be defined.

FIG. 5b is a diagram illustrating how the temporal projection plane may be defined and how it is related to its image point on the timeline, as well as how a temporal point is defined for each image.

Figure 6A:
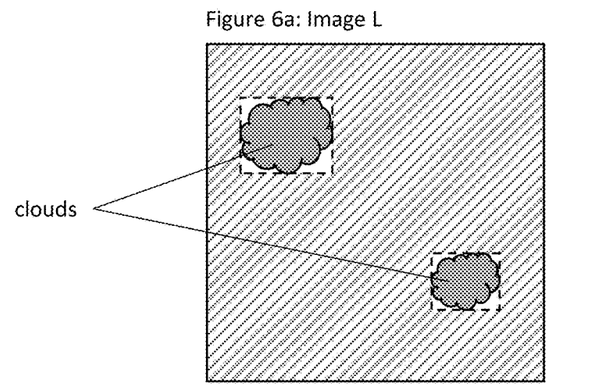
FIGS. 6a, b, c and d are diagrams illustrating how the temporal projection plane is used to form the user-requested image.
Figure 6B:
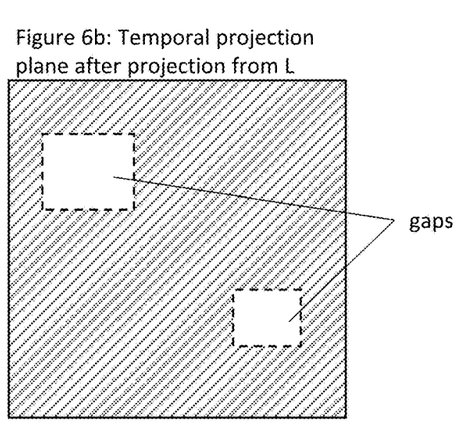

FIG. 6a is a diagram illustrating an example of how image L from FIG. 5b may appear with the obscuration free areas identified with a diagonal line pattern. FIG. 6b is a diagram showing the temporal projection plane after the projection of the obscuration free areas from image L. Two gaps have been left where the clouds were positioned in image L.

Figure 6C:
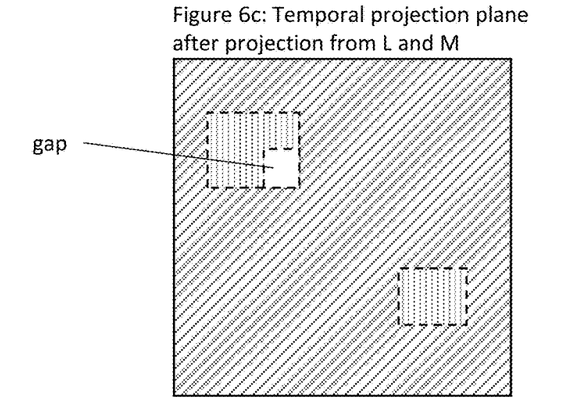

FIG. 6c is then a diagram showing the temporal projection plane after the projection of the obscuration free areas from image L, followed by the projection of obscuration free areas from image M onto the gaps left by image L. Following the two projections, there is still a gap left where clouds have obscured ground imagery.

Figure 6D:
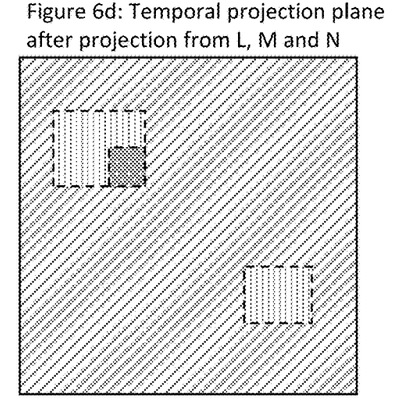

In order to fill this gap, FIG. 6d is a diagram showing the temporal projection plane after the projection of the obscuration free areas from image L and M, followed by the projection of obscuration free areas from image N onto the gap left by images L and M. Following the three projections, there are then no more gaps in the temporal projection plane and the user-requested image is complete.

Figure 7:
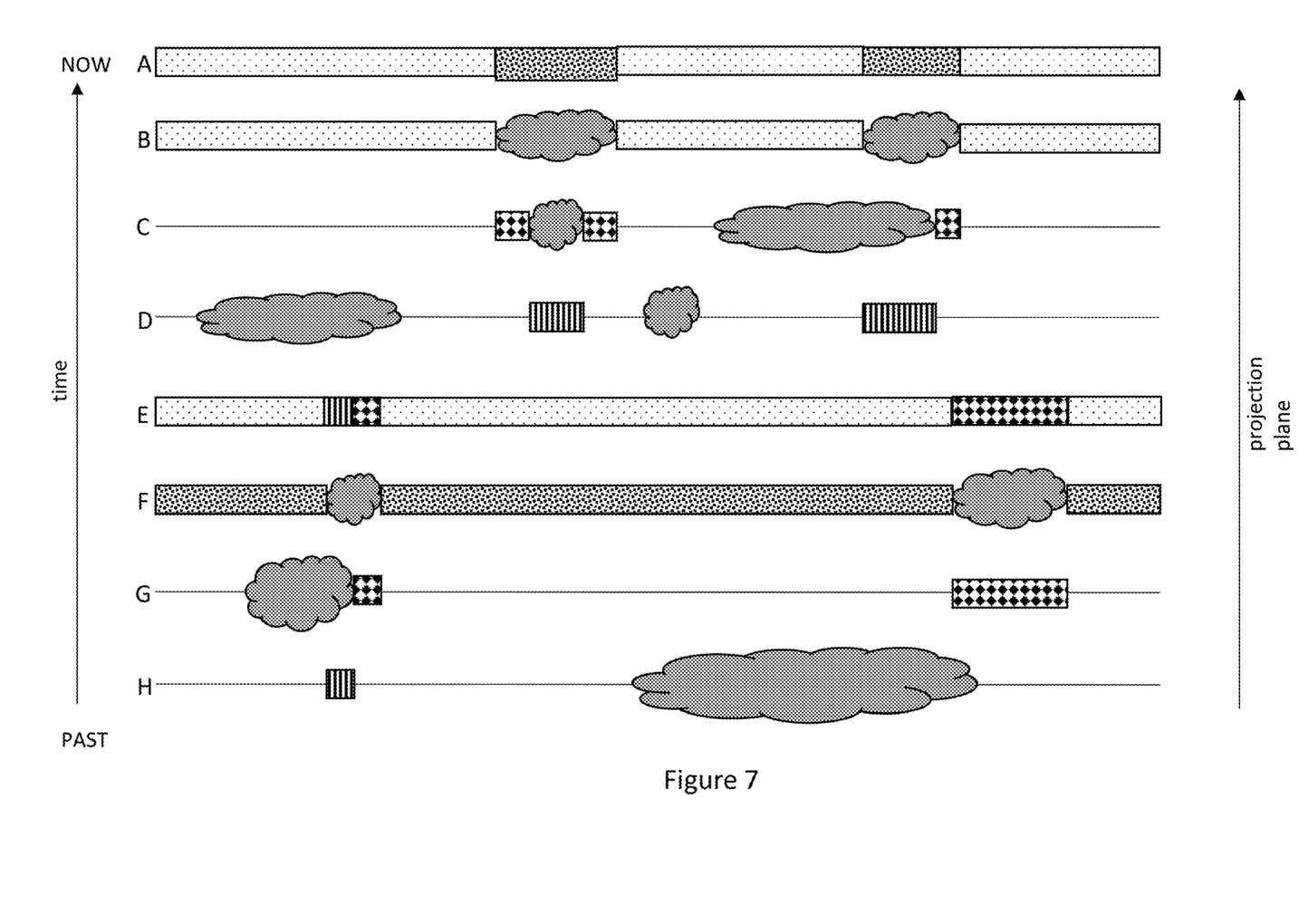
FIG. 7 is a diagram illustrating a further example image stack, showing how a composite image can be formed from different images in the stack taking into account seasonality of the images.

FIG. 7 shows a further embodiment, which takes into account the possible seasonality of the landscape shown in the images in the temporal stack. Here, consider that image A is to be produced as a composite image, based on the most recently available image of the area to be imaged in the virtual temporal stack. The most recently available image in the stack is image B, but as shown that has two areas that are cloud occluded, and which need to be filled from other, earlier, images in the virtual temporal stack.

Now, consider that image B was taken during the summer, when the trees and other vegetation in the image are in full leaf, and there is no snow or water on the ground. IN order to match these conditions, it is necessary to select another image to fill the cloud occlusions from a time point in the virtual temporal stack which will exhibit the same conditions. For example, selecting from a winter image to try and fill occlusions in a summer-obtained image will likely mean that there is mismatch between the data in the two images, in that the image data from the winter image may show snow on the ground, or have different coloured vegetation than the summer image. To match the occlusion in image B it is therefore necessary to be temporally selective in which images in the virtual temporal stack may be used as the basis for substitute image data into image B, in that only those images that seasonally match the base image into which image data is to be substituted should be used as candidate images from which substitute image data is taken.

In the example of FIG. 7, assume that image plane B is from summer, and the image planes C, D, E, and F have three month intervals therebetween and hence relate respectively to spring, winter, autumn, and summer respectively. In the example of FIG. 3 where seasonality was not taken into account then it was possible to fill the cloud occlusions in image plane B by taking image data from images C and D, as shown in FIG. 3. However, in the present example that would mean mixing spring and winter image data from image planes C and D into the summer image of image plane B, which would lead to a mismatch. Likewise, neither would using image data from image plane E, an autumn image, be useful, as the vegetation shown therein would likely be of a different colour, hence again leading to mismatch. Therefore, in order to avoid such seasonal mismatches, particularly on colour of vegetation in the image, it is necessary to use an image from further down the stack, and in particular from those images in the stack that seasonally correspond to the base image that is being used to create the composite image, in this case the image plane B. In this example, the most recent seasonally corresponding image that contains image data that is available to fill the cloud occlusions is from image plane F, and hence it will be seen that data from image plane F is used to fill the cloud occlusions in image plane B to produce image plane A. If the data from image plane F had had cloud occlusions in the same locations as image plane B, then it would have been necessary to go deeper into the virtual temporal image stack to find another summer image which did not have cloud occlusions in the same place.

The uses of embodiments and aspects described herein are varied. One such use involves comparing two cloud free images of a geographic area that have been generated for different times i.e. two different temporal points, to permit changes in geospatial features to be detected. Such change detection may be performed automatically, by a suitably programmed computer. In such a use scenario two (or more) cloud free images are generated for two different points in time corresponding to the temporal period over which changes are to be detected. For example, the temporal period may be measured in months or years, for example 1 or 2 years. The above described method and system is then operated to generate a respective cloud free image for each end of the temporal period, and those two respective images can then be analysed to determine any geospatial changes therein. The analysis can be conducted automatically by a suitably programmed computer, using computer vision processing techniques.

Geospatial changes that can be detected include changes in vegetation, including changes in the size and extent of trees, hedgerows, and other bushes, and crops, as well as changes in buildings, specifically in the location, size, and extent of buildings. One particularly useful application of the described arrangements in in policing the size, location and/or general extent of hedges, because in some countries payments are made to landowners to preserve hedges in rural areas. Any system that is able to detect automatically the extent of hedges is able to help in anti-fraud operations in relation to such payments.

In a further example, the stack of images may be updated, either by the insertion or deletion of images therefrom, and any resulting image that is based on the stack dynamically recalculated taking into account the change to the stack. Thus for example, imagine in the example of FIG. 7 that it was found that the image data in image plane C could not be relied upon for some reason, for example because the data is corrupted, or there is some other reason why it should not be used, then in order to produce the contemporaneous image plane A, additional data would need to be taken from image plane D, to compensate for the loss of image plane C. Specifically, data from image plane D that corresponds to the full extent of that missing from image plane B due to cloud cover would be taken from image plane D, as image plane D has no cloud cover in the same location as image plane B. The main point, however, is that the determination of the resulting image A is re-performed to adapt for the loss of image plane C. This re-determination may be performed dynamically when the image plane C is removed from the stack, so that the system is adaptive to changes in the stack image data.

The opposite process can also happen if new historical image data is obtained that is added into the stack, in that a resulting image may be re-calculated to take into account the new data that is added in. For example, and to use the reverse example of above, imagining that in the original stack image plane C is not included, in which case image plane A is formed from data from image plane B where there are no clouds, and image plane D where there are clouds in image plane A. However, if we then add in image plane C, then there is more recent data for part of the cloud-occluded parts of image plane B, and hence that more recent data can be used to provide a more accurate composite image plane A. In this case image plane A then becomes formed of data from all of image planes B, C, and D, as originally described above.

As with the case of removing image planes from the data stack, when inserting image planes, then the recalculation of the desired resultant image may be undertaken automatically and dynamically, as the new data image planes are added into the stack. In this way, any resultant images are kept as up to date as possible as changes in the image data in the stack takes place.

Various modifications, whether by way of addition, deletion and/or substitution, may be made to all of the above described embodiments to provide further embodiments and aspects, any and/or all of which are intended to be encompassed by the appended claims.

The invention claimed is:

1. A computer implemented method of generating an image of a geographic area, comprising:
   a) storing a plurality of overhead images of the geographic area, the images having been obtained at different points in time and virtually temporally stacked, ordered by date of capture such that the temporal ordering of the images is known;
   b) receiving a user input defining a point in time at which an image of the geographic area is desired, wherein the point in time is a historical date;
   c) defining a virtual temporal projection plane based on the defined point in time, the virtual temporal projection plane being where a composite image is to be formed;
   d) selecting, based on temporal proximity to the defined point in time, an image from the plurality of images to act as a base image, the selected image being an image from the virtual stack which is closest in time to the defined virtual temporal projection plane;
   e) determining any areas in the base image in which the geographic surface is occluded by cloud cover in the base image, the remaining areas therefore being occlusion-free areas;
   f) virtually projecting the occlusion-free areas of the base image to the virtual temporal projection plane to partially form the composite image, the partially formed composite image comprising gaps corresponding to the areas in the base image which were determined to be occluded;
   g) selecting a second one of the plurality of overhead images that is temporally earlier in the virtual stack than the base image;
   h) substituting virtually projecting geographically corresponding sections of the selected second image where the ground is not occluded onto the virtual projection plane to fill at least some of the gaps in the composite image, to provide a composite image having fewer occlusions than the base image; and
   i) repeating steps g) and h) with progressively earlier images in the virtual stack being used as the second image until all of the gaps in the composite image have been filled with non-occluded imagery from earlier images.

2. A method according to claim 1, wherein the overhead images are one of:
   i) satellite images; and/or
   ii) aerial images.

3. A method according to claim 1, wherein the second one of the plurality of overhead images is selected in dependence on the selected image being seasonally matching to the base image.

4. A method according to claim 1, and further comprising inserting a new overhead image taken at a point in time into the sorted plurality of overhead images, the image being inserted into the virtual temporal stack at a point such that the temporal sorting ordering of the plurality of images is maintained, and repeating steps b) to if) above on the basis of the virtual temporal stack including the new overhead image.

5. A method according to claim 4, wherein the method is dynamically performed when any addition of images to the virtual temporal stack is undertaken.

6. A method according to claim 1, and further comprising removing one of the overhead images taken from the sorted plurality of overhead images, and repeating steps b) to i) above on the basis of the virtual temporal stack excluding the removed overhead image.

7. A method according to claim 6, wherein the method is dynamically performed when any removal of images from the virtual temporal stack is undertaken.

8. A computer-implemented method of detecting changes in a geographic area, the method comprising:
   generating first and second images of the geographic area, the first and second images being respectively generated for different points in time separated by a change period over which changes are to be detected, the first and second images being respectively generated by:
   a) storing a plurality of overhead images of the geographic area, the images having been obtained at different points in time and virtually temporally stacked, ordered by date of capture such that the temporal ordering of the images is known;
   b) receiving a user input defining a point in time at which the first or second image of the geographic area is desired, wherein the point in time is a historical date;
   c) defining a virtual temporal projection plane based on the defined point in time, the virtual temporal projection plane being where a composite image is to be formed;
   d) selecting an image from the plurality of images to act as a base image, the selected image being an image from the virtual stack which is closest in time to the defined virtual temporal projection plane;
   e) determining any areas in the base image in which the geographic surface is occluded by cloud cover in the base image, the remaining areas therefore being occlusion-free areas;
   f) virtually projecting the occlusion-free areas of the base image to the virtual temporal projection plane to partially form the composite image, the partially formed composite image comprising gaps corresponding to the areas in the base image which were determined to be occluded;
   g) selecting a second one of the plurality of overhead images that is temporally earlier in the virtual stack than the base image;
   h) virtually projecting geographically corresponding sections of the selected second image where the ground is not occluded onto the virtual projection plane to fill at least some of the gaps in the composite image, to provide a composite image having fewer occlusions than the base image; and
   i) repeating steps g) and h) with progressively earlier images in the virtual stack being used as the second image until all of the gaps in the composite image have been filled with non-occluded imagery from earlier images;
   wherein steps (a) to (i) are performed to generate a first composite image which comprises the first image, and steps (a) to (i) are performed to generate a second composite image which comprises the second image;
   the method further then comprising comparing the generated first and second images to detect changes in geospatial features in the geographic area depicted in the first and second images.

9. A method according to claim 8, wherein the changes in geospatial features that are detected include one or more of:
   i) changes in the size, location and/or extent of vegetation; and/or
   ii) changes in the size, location and/or extent of buildings.

10. A computer system, comprising:
i) a processor;
ii) a display;
iii) a user input device; and
iv) a computer readable storage medium, the computer readable storage medium storing a computer program arranged such that when it is executed it causes the computer system to operate so as to:
a) store a plurality of overhead images of the geographic area, the images having been obtained at different points in time and virtually temporally stacked, ordered by date of capture such that the temporal ordering of the images is known;
b) receive a user input defining a point in time at which an image of the geographic area is desired, wherein the point in time is a historical date;
c) define a virtual temporal projection plane based on the defined point in time, the virtual temporal projection plane being where a composite image is to be formed;
d) select an image from the plurality of images to act as a base image, the selected image being an image from the virtual stack which is closest in time to the defined virtual temporal projection plane;
e) determine any areas in the base image in which the geographic surface is occluded by cloud cover in the base image, the remaining areas therefore being occlusion-free areas;
f) virtually project the occlusion-free areas of the base image to the virtual temporal projection plane to partially form the composite image, the partially formed composite image comprising gaps corresponding to the areas in the base image which were determined to be occluded;
g) select a second one of the plurality of overhead images that is temporally earlier in the virtual stack than the base image;
h) virtually project geographically corresponding sections of the selected second image where the ground is not occluded onto the virtual projection plane to fill at least some of the gaps in the composite image, to provide a composite image having fewer occlusions than the base image; and
i) repeat steps g) and h) with progressively earlier images in the virtual stack being used as the second image until all of the gaps in the composite image have been filled with non-occluded imagery from earlier images.

11. A system according to claim 10, wherein the overhead images are one of:
i) satellite images; and/or
ii) aerial images.

12. A system according to claim 10, wherein the second one of the plurality of overhead images is selected in dependence on the selected image being seasonally matching to the base image.

13. A system according to claim 10, and further comprising inserting a new overhead image taken at a point in time into the sorted plurality of overhead images, the image being inserted into the virtual temporal stack at a point such that the temporal ordering of the plurality of images is maintained, and repeating steps b) to i) above on the basis of the virtual temporal stack including the new overhead image.

14. A system according to claim 13, wherein the method is dynamically performed when any addition of images to the virtual temporal stack is undertaken.

15. A system according to claim 10, and further comprising removing one of the overhead images taken from the sorted plurality of overhead images, and repeating steps b) to i) above on the basis of the virtual temporal stack excluding the removed overhead image.

16. A system according to claim 15, wherein the method is dynamically performed when any removal of images from the virtual temporal stack is undertaken.

* * * * *